United States Patent [19]
Kohlbach et al.

[11] Patent Number: 4,999,978
[45] Date of Patent: Mar. 19, 1991

[54] ASEPTIC FILLING APPARATUS

[75] Inventors: Friedrich R. Kohlbach, Greifenburg, Fed. Rep. of Germany; John L. Rawson, Newcastle-upon-Tyne, United Kingdom

[73] Assignee: Bowater Packaging Limited, London, United Kingdom

[21] Appl. No.: 425,821

[22] Filed: Oct. 23, 1989

[30] Foreign Application Priority Data

Oct. 25, 1988 [GB] United Kingdom ............... 8824925
Sep. 26, 1989 [EP] European Pat. Off. ......... 89309806.1

[51] Int. Cl.⁵ .................... B65B 31/02; B65B 31/06; B65B 43/26; B67B 7/02
[52] U.S. Cl. ........................... 53/512; 53/88; 53/268; 53/283; 53/381.4; 141/66; 141/48; 141/49; 141/114; 141/310
[58] Field of Search ............ 53/403, 407, 432, 434, 53/425, 426, 468, 469, 86, 88, 89, 109, 381 A, 268, 283; 141/85, 114, 310, 65, 66, 47, 48, 49

[56] References Cited

U.S. PATENT DOCUMENTS

| | | | |
|---|---|---|---|
| 3,921,685 | 11/1975 | Steffes | 141/310 |
| 4,363,338 | 12/1982 | Brown | 53/381 A |
| 4,452,030 | 6/1984 | Inada | 53/426 |
| 4,494,363 | 1/1985 | Rica et al. | 53/426 |
| 4,498,508 | 2/1985 | Scholle et al. | 53/88 X |
| 4,524,563 | 6/1985 | Sassi | 53/426 |
| 4,731,978 | 3/1988 | Martensson | 53/381 A X |
| 4,805,378 | 2/1989 | Anderson | 53/426 |
| 4,832,096 | 5/1989 | Kohlbach | 141/65 X |

FOREIGN PATENT DOCUMENTS 0212201 3/1987 European Pat. Off. .
2097770 11/1982 United Kingdom .

Primary Examiner—Horace M. Culver
Attorney, Agent, or Firm—Cumpston & Shaw

[57] ABSTRACT

A method and apparatus for aseptically filling containers with product, such as the bags (B) of bag-in-box containers, wherein the aseptic filling chamber (9 or 40) with a filling head or nozzle (5 or 43) therein is provided with fluid inlet and outlet lines (2,4,6,8,19,21,39 or 57,59,63) to create desired positive or negative atmospheric conditions within the chamber, so that a positive pressure can be maintained within the chamber when change over, at an aperture in the chamber, of a bag to be filled occurs, and so that after filling, a negative pressure (through line 15 or 63) can be generated to evacuate the chamber and hence remove any headspace gas from the top of the filled container prior to it being capped.

10 Claims, 3 Drawing Sheets

ASEPTIC FILLING APPARATUS

This invention relates to apparatus and a method for aseptically filling containers with product, particularly particulate product, and especially the bags used in bag-in-box containers. The invention has been particularly conceived for the filling of 200 liter bulk containers of the bag-in-box or bag-in-drum variety with fruit, fruit juice and other products containing particulate matter, such as, for example, sliced peaches, plums or the like in syrup, or products such as yoghurt, soup and vegetables in salted water. There is a tendency nowadays for such products to be packed in bulk and it is important therefore that the products are inserted aseptically into the bulk container, e.g. 200 liter bag-in-box, under fully aseptic conditions, and that asepticity is maintained both for the filling machine and the bag itself. It will be appreciated, however, that the invention can be used for filling packs of sizes from about 5 to about 1000 liters, with any fluid material.

The invention has been specifically developed for excluding undesirable gases from the headspace of a container which has been filled with product under aseptic filling conditions.

Methods are already known of producing aseptic product and subsequently aseptically packaging it in flexible plastic liners of all sizes from small 5 liter bag-in-box containers to large 200 liter bag-in-drum containers. One such method is disclosed in the specification of our U.K. Patent No. 2097770B. While such methods do succeed in keeping the product under aseptic conditions even after packaging, there can still be deterioration of the product in the container because of the residual gases left in the headspace above the product in the container. Although these gases may be sterile, they can deteriorate the product in that they can, for example, cause organoleptic and visual degradation. Furthermore, of course, if the headspace gases are not sterile then the food product can degrade due to microbiological action. Such degradation, whether it be microbiological, organoleptic or visual, is of course undesirable and various methods have been proposed for solving the problem, one of which is to provide a suction pipe in the centre of the product filling head, such as disclosed in EP-A-0212201. The problem with this, however, is that there is a risk that some of the product from the top of the container can be drawn up within the suction pipe and as a result this can become contaminated and is subsequently placed within the next container to be filled. If steps are taken to prevent this occurring, then it is necessary to pass a jet of gas through the suction pipe and as a result the negative pressure in the headspace of the container is lost prior to closing of the container.

The present invention seeks to overcome the problems associated with known methods and to ensure a satisfactory exclusion of undesirable headspace gases prior to closure of the container.

According to the present invention, we provide apparatus for aseptically filling containers with product, including a filling chamber with which the upper end of a container to be filled is connected for filling, a filling head within the chamber to place the product within the container under aseptic conditions, means remote from the filling head to create a desired gaseous condition within the chamber and thus at the top of the filled container, said means remote from the filling head including means to create a negative pressure within the chamber to evacuate any gas from the top of the container while the container is still connected to the chamber, and means to close the upper end of the container while said gaseous condition is maintainted.

Said means may also comprise means for introducing a sterile or inert gas into the chamber and hence into the top of the container above the product.

The means remote from the filling head preferably comprises fluid extractor/injector means which, after the head of the container has been closed, applies a positive pressure to the chamber, whereupon the head of the container is removed from the chamber. The positive pressure prevents ingress of air into the chamber.

The container may be a liner bag of a bag-in-box container, in which case it will have a spout with a closure cap in a wall thereof, the capped spout being presented up into the chamber while it is under positive pressure from said means, whereupon the closure cap of the previously sterilised bag is removed under aseptic conditions, a filling head is inserted into the spout and the bag is filled with product, all these operations occurring under said positive pressure, the filling head then being removed from the spout and said negative pressure then being applied by said extractor/injector means subsequent to which the closure cap is placed upon the filled bag.

Preferably, the fluid extractor/injector means includes one or more sterile gas and/or sterilant spray injector means mounted in the wall of the chamber opposite the filling head and an extractor unit connected to a port in the chamber wall and capable of providing a negative pressure which will overcome the positive pressure provided by the spray injector means, so that once the closure cap has been applied to the filled bag, the positive pressure may be applied again to the chamber, whereupon the capped spout is removed from the chamber ready for another capped spout of an unfilled bag to be presented up into the chamber.

The reference to positive and negative and negative pressure is of course relative to atmospheric pressure.

Preferably also, steam inlet and outlet lines extend into and out of the chamber, and to and from the equipment in the chamber.

Preferably, positive pressure is applied using two sterile gas spray injectors which spray sterile gas incorporating atomised sterilant into the chamber adjacent the filling head at all times so as to prevent ingress of air or foreign bodies into the sterile chamber.

Preferably, the apparatus is for aseptically filling a bag with particulate product, and the filling head terminates in a nozzle having a ball or stem valve at or adjacent an outlet end thereof, and the means for presenting the bag spout to the chamber, removing the cap, filling the bag, re-capping the filled bag and removing the full bag, are all of a generally known construction. However, the apparatus includes special means to maintain the interior of the chamber and any parts permanently or temporarily therein in aseptic or sterile condition.

The apparatus may include sealing means for sealing a portion of the bag to the rear face of its spout prior to the bag being withdrawn from an aperture in the chamber to form a secondary closure for the spout and an improved oxygen barrier for the spout area.

Alternatively, the spout could be in the corner of the bag, and after filling the spout could be isolated by sealing, across the corner, the two internal surfaces of the bag. Preferably also, the apparatus includes means to move the sealing means and means to activate the sealing means. This may be associated with means for moving the spout into and out of engagement with the aperture in the chamber, and with further means which may be provided to support the bag during a filling operation. This further means may comprise a support plate which completely supports the empty bag, or which at least partly collapses it, and which is gradually moved during filling of the bag so as to prevent bag rupture and ensure that the bag is uniformly filled with product and does not contain gas pockets.

Preferably, for particulate product, the valve means in the nozzle comprises a ball valve with a passageway therein extending diametrically through the valve and having a cross-section corresponding to that of a supply tube leading to the nozzle, the ball being movable through 90° between open and closed positions, and there being wiping seals between the ball and its housing.

The nozzle may have a fixed location and the chamber may be slidably movable in a direction parallel to the longitudinal axis of the nozzle. Alternatively, the chamber may be fixed and the nozzle may be movable.

Preferably also, the spout holder is movable along said axis as is a heat sealing head comprising said sealing means. The means for moving the cap from the spout may comprise a cap gripping arm movable within said chamber between a position in which said cap is centrally located on said axis and a position spaced therefrom.

Preferably, a steam inlet line delivers steam into said chamber to maintain a positive pressure therein and to activate other sterilising agents which may be injected into the chamber through other inlets. Preferably, a further steam condensate, sterile water or sterilising agent supply line extends into the interior of the nozzle to a position immediately downstream of the valve means and into the interior of the housing for the ball of the valve means, there also being an exit pipe from the interior of said valve housing.

It is preferred that opposite the aperture in a wall of the chamber there is a second aperture in another wall thereof through which the product supply tube passes, there being a sliding seal between the supply tube and the second aperture which itself is maintained in an aseptic or sterile condition by means of further steam supply and condensate exit pipes.

In order to assist in extracting undesirable gases from the bag during a filling operation, e.g. by evacuating the chamber, one or more vents may be provided in the outer end portion of the filling nozzle, where it locates in the bag spout.

The invention also extends to a method of filling containers, especially bags, and sealing the bags, aseptically, with particulate product.

Three embodiments of the invention are now described by way of example with reference to the accompanying drawings, in which.

Figure 1:
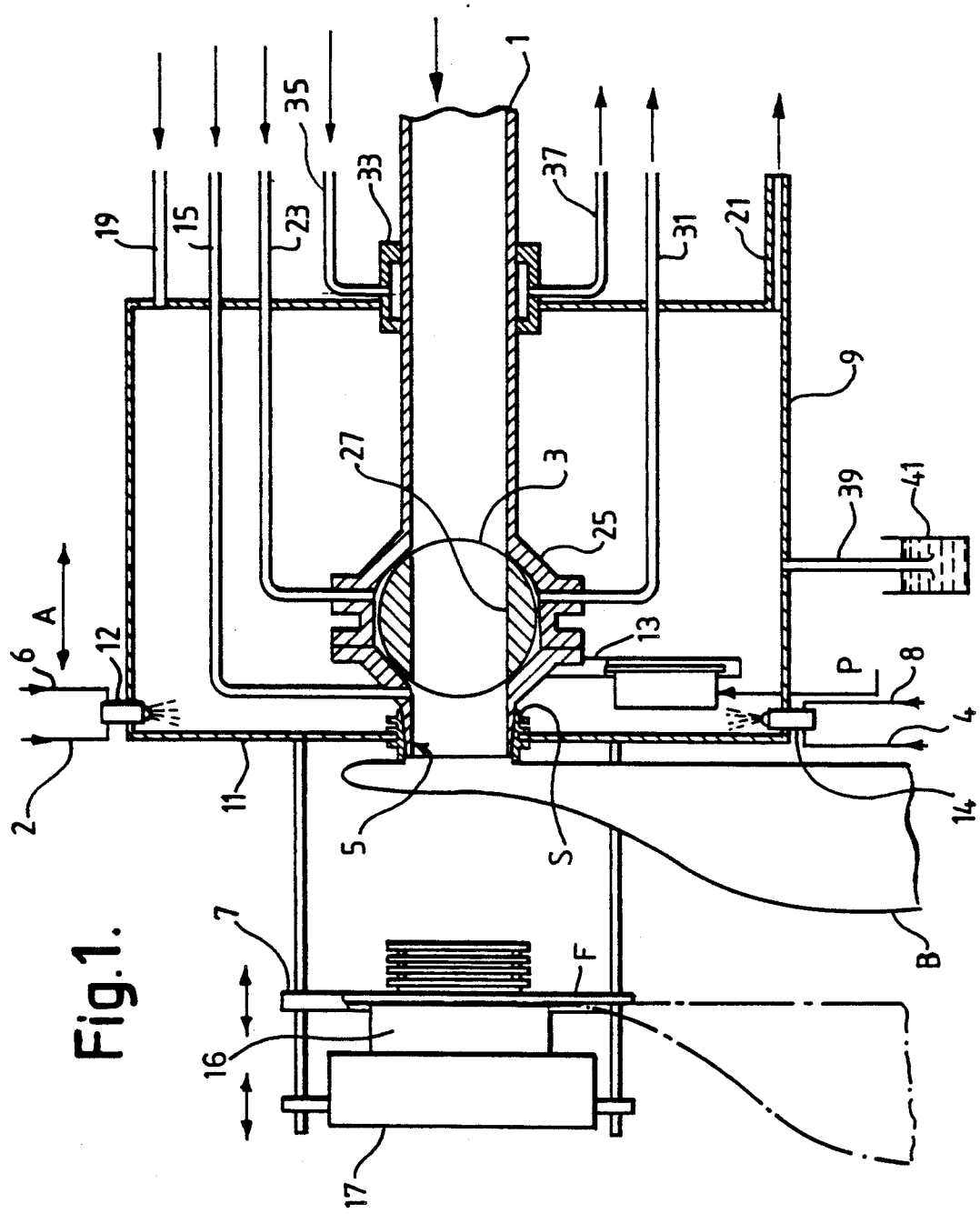
FIG. 1 is a largely schematic longitudinal section showing a bag being filled aseptically with a first embodiment of filling nozzle, which extends horizontally.

Referring now to FIG. 1, this shows in full line a liner bag B being filled with product supplied to it through a supply tube 1 under the control of a ball valve 3, there being a filling nozzle 5 downstream of the ball valve 3 which is engaged within a spout S secured in liquid-tight manner in a wall of the bag B.

Prior to the filling operation, a sterilised liner bag B has its spout S with a plug or cap P firmly located in its open end presented up into a spout holder 7 so as to occupy the position substantially as shown in broken lines.

The downstream end of the supply tube 1, the ball valve 3 and nozzle 5 are all located in a sterile chamber 9 which is mounted for sliding movement in the direction of the arrows A and when it is desired to fill a sterilised bag B with product, such as pieces of fruit, the spout holder 7 is moved towards the chamber 9 (although the chamber 9 could be moved towards the holder 7) so as to cause the spout S on the bag in the holder 7 together with its plug P to be presented into a central aperture in the front wall 11 of the chamber 9 so as to be firmly held within the aperture. The action of presenting the spout into the aperture can automatically cause a valve (formed by a pair of shutter plates [not shown]) normally closing off the aperture to be opened. However, if the chamber 9 is pressurised, as will hereinafter be described, the provision of a valve may not be necessary.

It is preferred that when a bag B is not being filled, the interior of the chamber 9 is kept at a positive pressure, thereby preventing the ingress of atmospheric air. This can be achieved in several ways. For example, steam can be fed into the chamber through a steam inlet 19, and/or sterile fluid can be pumped into the chamber from a supply line 2 or 4, through one or both of a pair of opposed fluid inlets 12, 14 in the walls of the chamber. In this way, aseptic conditions can be maintained within the chamber at all times.

Once the spout S is firmly located in the aperture in the wall 11 of the chamber 9, the closure plug P is removed from the spout in known manner by means of a clamp (not shown) supported on an arm 13, which then moves to the side, and a vacuum is applied to the chamber interior through vacuum line 21, so as to extract gas not only from the chamber, but from within the bag as well. While this is happening, or just subsequent thereto, a back pressure pad 16 is moved to the right as shown in the drawing to cause bag material to be moved into engagement with the back of the spout S. Subsequent to this, the open spout is brought into engagement with the nozzle 5 by moving the chamber 9 to the right as shown in the drawing (or by moving the supply tube 1, its valve 3 and the nozzle 5 to the left as shown in the drawing) so as to engage the nozzle 5 sealingly within the interior of the spout S as shown in the drawing. Once the nozzle 5 is engaged in the spout of the empty bag, the ball valve 3 is turned through 90° to its illustrated open position, and the bag is then filled with particulate, concentrate, or paste material such as sliced fruit, from a supply thereof, against the pressure of the pressure pad 16. When the bag is almost totally full, e.g. when 200 liters of product have accurately been metered into the bag, the supply of material is cut off by turning the valve through 90° in known manner, whereupon the nozzle 5 can be disconnected from the spout. Subsequent to this, any air in the top of the bag is extracted using the negative pressure within the chamber 9. This will draw out the air due to the chamber being connected to the vacuum line 21.

Figure 2:
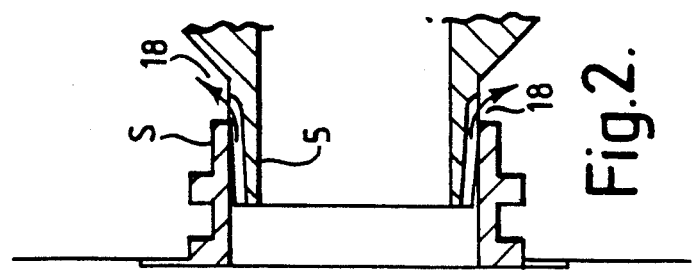
FIG. 2 is a sectional view, to an enlarged scale, showing a particular design of filling nozzle within a bag spout.

As an alternative, this can be achieved with the nozzle still within the spout, by using a nozzle as shown in FIG. 2. This nozzle has a plurality of vents 18 located around its periphery, which allow gas to escape from the bag while filling occurs. So long as the chamber is kept at negative pressure, gas in the bag, which can be introduced in the filling operation, will automatically be extracted. As a yet further alternative, the gas can be extracted by replacing it with steam. This can be achieved by disconnecting the vacuum line 21 to the chamber 9, and pumping steam under high pressure into the bag either through the nozzle 5 (the preferred way) or into the chamber 9, e.g. through the inlets 12, 14.

This steam will then cool and condense, thus causing a partial vacuum in the head space of the container.

It is then possible, if desired, to move the pressure pad 16 to the right to close off the rear of the spout with bag material again, and then to activate a heat sealing head 17 which is concentrically mounted therewith and is so located that it will cause the material of the bag B where it is in abutting relationship with the rear or underside of the flange F of the spout where the latter is joined to the wall of the bag to be pushed into full engagement with the flange F, whereby it is heat sealed to the flange F. This will form a secondary and permanent seal closing off the interior of the bag from any ingress of air and hence bacteria which may find its way past the plug P, which in the meantime is replaced in the spout S. The pad 16 and head 27 are then both retracted fully to the left.

The nozzle 5 is removed from within the spout S by moving the chamber 9 to the left as shown in the drawing (or by moving the nozzle 5, the valve 3 and the tube 1 to the right as shown in the drawing) by a sufficient amount so that the closure plug P can then be moved back into alignment within the open end of the spout S and can then be replaced within the spout S, thus closing off the top of the bag. While this is happening, the vacuum is maintained within the chamber, unless steam is used.

Once the bag filling and plugging operation has been completed, the interior of the chamber 9 is pressurised with steam and/or inert gas or sterile air through the line 19 and/or inlets 12 and 14. Thereupon, the spout S is removed from the aperture in the wall 11 of the chamber 9 by moving the holder 7 to the left, and the shutter plates or valve (if provided) then automatically close off the aperture. The filled and sealed liner bag B which will then be in the position shown in broken lines in the drawing is removed from the holder 7 and replaced by a new bag to be filled.

It is important that the filling of the bag be carried out under full aseptic conditions and hence it is important to ensure that bacteria do not find their way into the chamber 9, by maintaining a positive pressure in the chamber 9, e.g. by means of the steam entering through the pipe 19. There is an outlet 21 in the chamber to compensate for the steam or gas being pumped into the chamber through the pipe 19. Furthermore, in order to maintain the ball valve 3 sterile at all times and also to clean off any particulate or fibrous material which may have been attracted to its surface, there is a further steam, condensate or sterilant supply pipe 23 which leads into the interior of a housing 25 in which the ball 27 of the valve 3 rotates. Suitable wiping seals 26 are provided between the ball 27 and the housing 25 but in spite of these there is usually a film of liquid from the particulate material on the surface of the ball 27, which has to be kept in a sterilised condition. To compensate for the steam, condensate or sterilant being fed through the pipe 23 into the space between the housing 25 and the ball 27 there is an outlet pipe from the said area, this pipe being shown at 31.

The product supply tube 1 has to pass through a wall of the chamber 9 opposite the wall 11 and since the tube 1 and chamber 9 can move relative to each other, a sliding seal 33 is provided between the two. To maintain this seal in a sterile condition and so as to prevent bacteria from passing into the chamber when an area of the tube 1 which was previously outside the chamber moves into the chamber, a further steam supply pipe 35 directs steam to the interior of the seal 33, there being a condensate outlet pipe 37 to carry excess steam away from the seal 33.

In order to supplement the steam and sterile air in the task of maintaining asepticity, a sterilant solution can be sprayed into the chamber, from a supply line 6 or 8, e.g. to sterilise the nozzle 5, or the spout of a bag or its plug P, through the inlets 12, 14. Furthermore, there is a drain 39 in the base of the chamber, the end of which terminates in a sterilant trap 41.

It will thus be appreciated that the above described apparatus for filling bags with particulate material ensures that the bags are filled under aseptic conditions at all times.

The construction shown in FIG. 1 could be modified so that it is operated in a vertical filling mode, rather than a horizontal filling mode. To achieve this, the front wall 11 of the chamber would become the base, but the filling aperture would remain in the base. However, the condensate outlet pipe 39 and trap 41 would have to be moved into the base wall 11. The only other modification which would be necessary would be to provide a suitable support for the bag to be filled. If the pressure pad and supplementary sealing equipment 16, 17 were dispensed with, this could be a support table beneath the spout aperture in the bottom wall 11 of the chamber 9 (a spout holder 7 and would still be needed). Otherwise, some form of conveyor device would be required to support the bag B and allow its spout S to be advanced into the vicinity of the aperture in the bottom wall of the chamber 9 from the side. This could be an endless belt conveyor.

Figure 3:
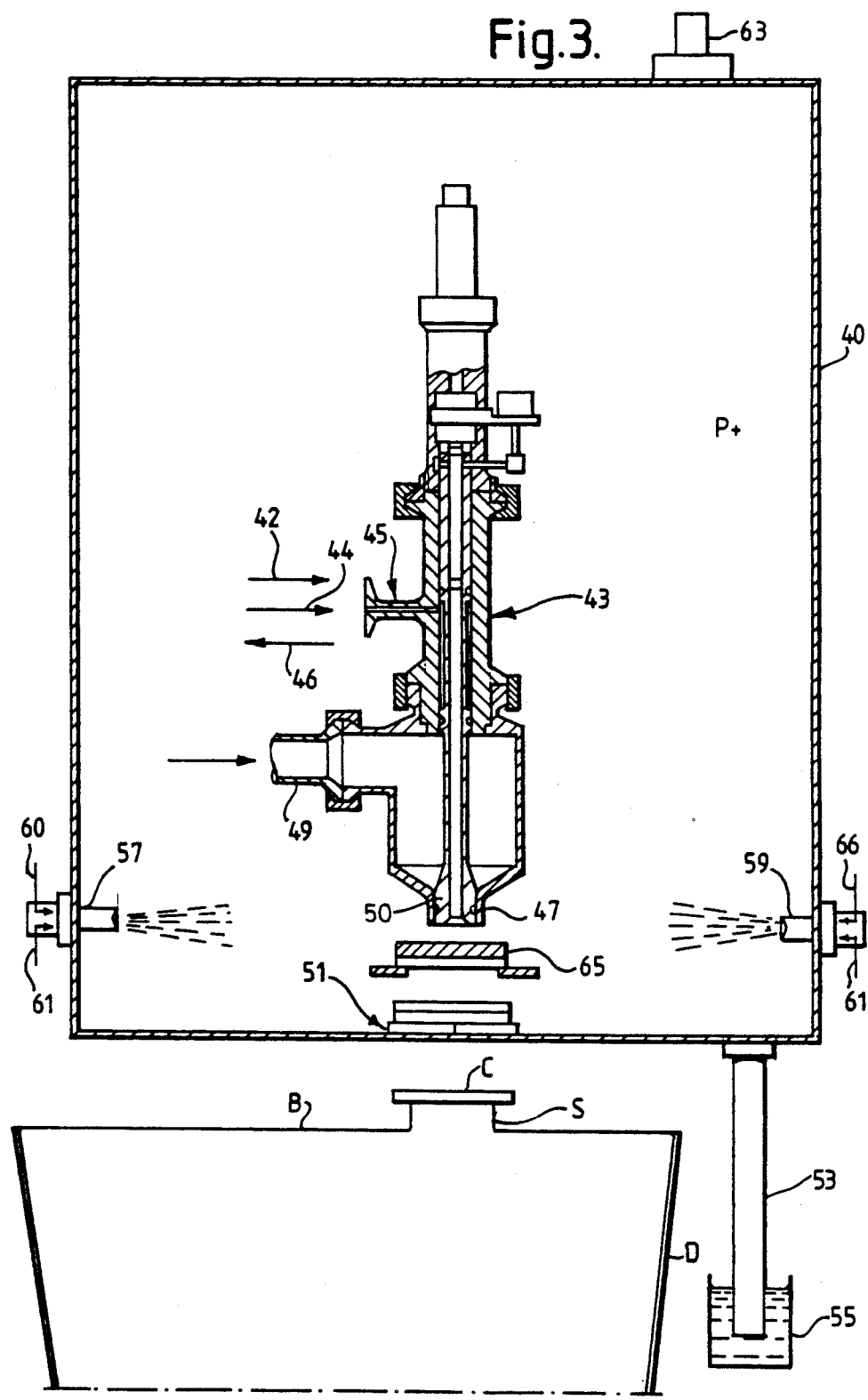
FIG. 3 is a partly schematic sectional view showing an alternative embodiment of filling nozzle which extends vertically, just after it has filled a liner bag in a drum under aseptic conditions.
Figure 4:
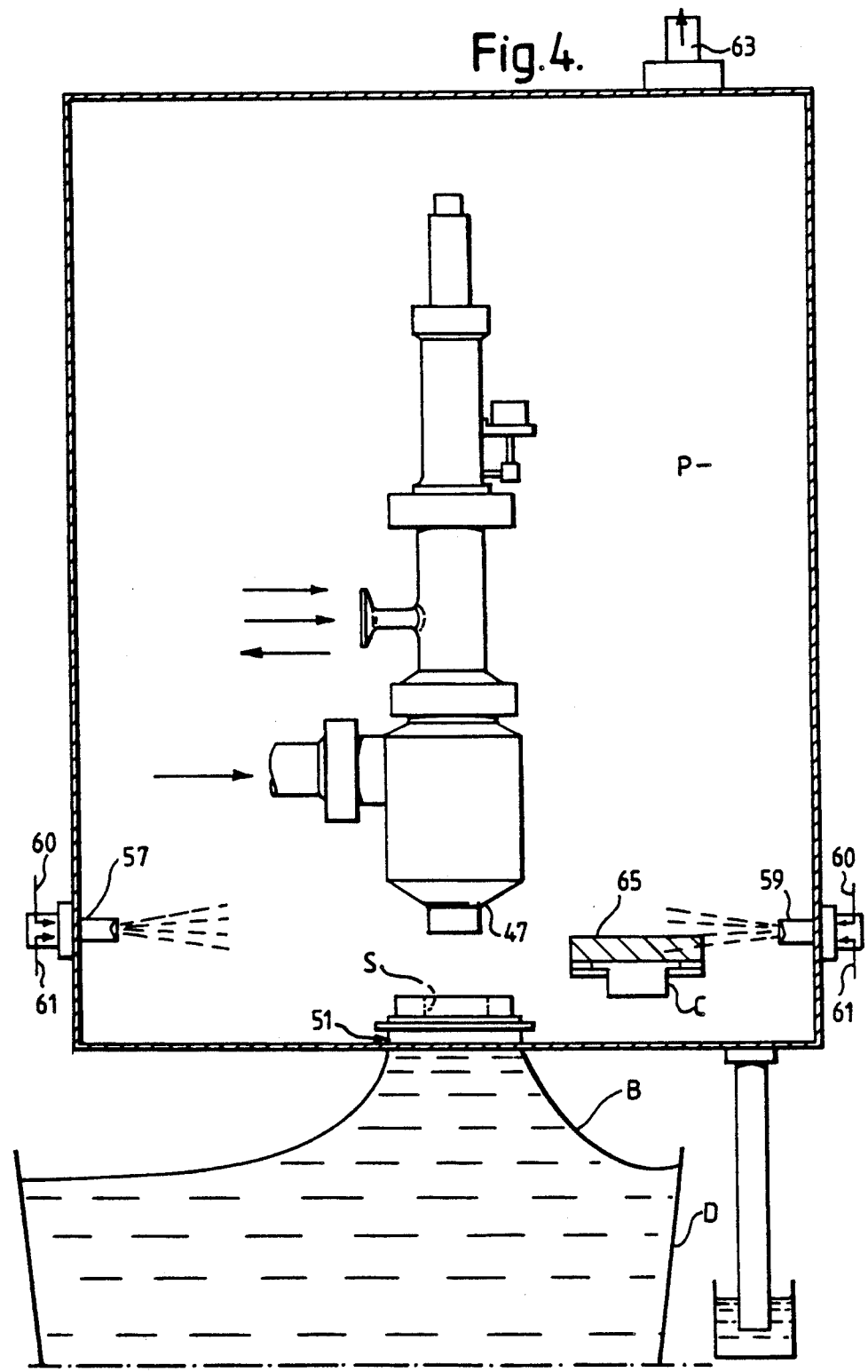
FIG. 4 is a view similar to FIG. 3 showing a subsequent step in an aseptic bag filling cycle.

Referring now to FIGS. 3 and 4 of the drawings, a filling apparatus is disclosed which has many similarities to that of FIG. 1, but which has a vertically orientated product supply nozzle, and a stem valve instead of a ball valve, which controls the supply of product through the nozzle. The apparatus includes a chamber 40 in which is located a stem valve 43 of generally known construction with a manifold 45 for connection to a flushing gas or steam 42 and/or a sterilant 44 and/or a source of vacuum 46. The stem valve 43 has a filling nozzle 47 at its lower end connecting with a supply pipe 49 for product. Product is allowed to pass through the nozzle 47 by opening a valve 50 therein in known manner.

Approximately centrally in the base of the chamber 40 is an aperture 51 for receiving a capped spout S of a liner bag B which has previously been located in a rectangular box made of fibrous sheet material or, as in this case, in a drum D. The chamber 1 also has a drainpipe 53 extending from an aperture in its base terminating in a bath 55 of sterilant. Furthermore, at opposed locations in its side wall(s), and generally opposite each other, a pair of inlet nozzles 57, 59 are provided which are connected to supply lines 60, 61 respectively for sterile air and a sterilant solution. In the top wall of the chamber 1, a port 63, which is connected to an extractor unit (not shown), is provided, for evacuating the chamber 40.

When it is desired to fill a liner bag B with product, the capped spout S of the bag shown in FIG. 3 is presented up into the aperture 51 and after being firmly located in sealing engagement within the aperture 51, a cap C is removed from the spout S. During this operation, the pressure within the chamber 40 is maintained above atmospheric pressure, by pumping sterile air through the nozzles 57, 59 and ensuring that the port 63 is closed, or the rate of gas extraction through the port 63 is less than the supply rate of the sterile air through nozzles 57, 59. This ensures that there is always an outflow of gas through the aperture 51 when it is open, thus keeping out any unwanted germs or the like. Once the cap C is removed (in known manner using a swinging gripper device 65) the apparatus is moved from the mode of FIG. 3 to that of FIG. 4, in which the port 63 is opened, and the extractor is caused to move the atmosphere in the chamber 40 to a negative pressure, so as to extract any gas from within the bag B. The nozzle 47 is then moved from the position shown in FIG. 4 down into the spout S, whereupon product is injected into the bag B until it is at least substantially full. Alternatively, however, during filling, a positive pressure may be applied to the interior of the chamber 1 through the nozzles 57, 59 and the port 63 may be closed. During filling, some gas may be released into the bag, and/or after filling, there may be a small headspace in the bag which is occupied by gas. To reduce headspace, this gas must be removed, and the various ways of achieving this are similar to those described with reference to the apparatus shown in FIGS. 1 and 2. It is preferred, however, that immediately after filling, the apparatus is switched to the state shown in FIG. 4 whereby the extractor unit overcomes the positive pressure from the nozzles 57, 59 by withdrawing air from the chamber 40 through port 63 so that a negative pressure results in the chamber (even though sterile air and/or sterilant is still being injected into the chamber through the nozzles and and hence of course over the cap C so as to maintain sterility both of the cap and around the spout S and the aperture 51). The negative pressure within the chamber 1 will of course be communicated to the inside of the liner bag B thus withdrawing the gas from the headspace in the liner and resulting in atmospheric pressure partly collapsing the top wall of the liner so as to cause the product in the liner to move to the very topof the liner. As soon as this state is achieved, the apparatus is maintained in the mode of FIG. 4 and the cap C is placed into sealing engagement within the spout S.

Once the spout has been capped, the extractor unit is turned off, thus switching the apparatus from a negative pressure mode to a positive pressure mode, due to sterile gas from the nozzles 57, 59 entering the chamber. Once the chamber is under positive pressure again, the re-lidded liner from which headspace gas has been removed is disconnected from the aperture 51 in the base of the chamber 1. Because of the positive pressure within the chamber, external air is prevented from entering the chamber. A new liner to be filled is then presented up into the aperture and placed in sealing engagement therewith, whereupon its cap is removed and the liner is filled with product and the sequence repeated.

As with the previous embodiment, instead of filling the bag B in an outer container D, it can be supported on a table, which is gradually lowered during the filling operation to prevent bag rupture, and keep the volume of gas in the bag to a minimum. Also, if desired, bag material can be sealed against the rear of the spout S after filling and gas extraction. Instead of using a table, a collapsible pressure pad can be used to apply a back pressure against which filling takes place.

There are other important features of the apparatus which are preferably provided in all embodiments to achieve total asepticity, and/or to give adaptability for filling different products into the bags.

For example, when filling the bag with lumpy and/or fibrous material, some of this material can remain on the bag spout S and/or on the filling nozzle. Steam, sterilant (or inert gas) can be sprayed from the inlets 57, 59 (it may be necessary to provide more than two such nozzles) to clean the nozzle and likewise steam, sterilant or inert gas can be sprayed down the centre of the stem valve after a filling operation is complete, and prior to gas extraction, to spray material on the bag spout into the bag, prior to re-capping. Likewise, any material on the nozzle can be flushed off the nozzle and into the bag, so that the valve 50 in the nozzle will seal properly, and the nozzle will remain sterile.

It is difficult to fill evacuated liner bags with some products, and in a modification of the invention, it is possible, instead of evacuating a bag after de-capping it, to inject a gas, e.g. an inert gas such as $CO_2$, into the bag, and to extract this gas during or after filling. Certain products are best filled using this 'controlled atmosphere packing technique'. In the case of some dairy products, for example, steam can be injected into the bag.

For some products, it may be advantageous to inject enzymes, a preservative, a sauce or an aroma, for example, prior to capping the filled bag. This can be done through the filling nozzle, or through one of the gas/fluid inlets 57, 59 or 12, 14, if a FIG. 2 type nozzle is used.

Likewise, gas can be injected into the bag, or can be withdrawn from the bag, through the filling nozzle 5 or 47 (either construction) or through the channels 18 in the nozzle shown in FIG. 2, or through the inlets 57, 59 (or 12, 14) and can be withdrawn, of course, through the port 63 (or 21).

Another way of withdrawing unwanted gas from within the bag (in either embodiment) is to use a pressure compensating system, with a tube connected to the inlet end of the filling valve, and then extending in the form of an inverted U to a negative atmosphere sterile chamber. Any air in the bag will be pulled by the negative pressure into the sterile chamber.

Although the invention has been particularly described with reference to the filling of collapsible bags, it will be appreciated that it could also be used for filling other containers, such as rigid or bulk containers.

It will be appreciated, in the case of filling bags, that some bags may be partially maintained in a sterile state by an internal or external film of material extending across the spout opening. In this event, it may be necessary to fit the filling nozzle 5 or 47 with a mechanical or other type of film puncturing device if the pressure (or heat) of the product being filled will not puncture the film.

To summarise, therefore, the various embodiments of the invention provide an apparatus and a method for filling containers, especially bag-in-box containers, with product, especially particulate product, totally aseptically. For a bag, this may be achieved as follows:

(1). Provide an aseptic filling chamber having a filling nozzle controlled by a ball or stem valve (or other type), with product, inert gas (or other gas for controlled atmosphere packaging), vacuum and/or steam/sterilant passages.

(2). Fit the chamber with bag de-capping and re-capping equipment and inlets for sterilising sprays, inert or other gases, and at least one evacuating port.

(3). Optionally provide a movable support plate pad for supporting the bag if it is not in another container, and for collapsing it initially, and then for lowering the bag as it is filled, or a pressure plate to control the filling operation.

(4). After de-capping the pre-sterilised bag, draw out any gas and then optionally fill it with another gas, e.g. CO2 or steam.

(5). Fill with product under negative pressure to remove gas, or a positive pressure of special gas.

(6). Flush all equipment and spout to remove residual product and clean.

(7). Re-cap after withdrawing gas from headspace, or injecting steam.

(8). Further cleaning/flushing.

(9). Pressurise chamber to prevent ingress of air or other matter.

(10). Remove capped container and replace with another and repeat same or modified cycle.

Some of the above steps may be modified, repeated or omitted.

It will of course be understood that the present invention has been described above purely by way of example, and modifications of detail can be made within the scope of the invention. For example, it is often possible, instead of using steam to sterilise, to use a different fluid, such as a sterilant, or vice-versa. In other words, any sterilsing agent can be used to sterilise. However, where only a cleaning agent is required, i.e. washing or flushing out of a sterile area contaminated with sterile product, all that is required is a clean washing fluid, such as condensate or sterile water or other fluid.

We claim:

1. Apparatus for aseptically filling containers with product, including a filling chamber with which the upper end of a container to be filled is connected for filling, a filling head within the chamber to place the product within the container under aseptic conditions, and means remote from the filling head to create a desired gaseous condition within the chamber and thus at the top of the filled container, wherein said means remote from the filling head includes means to create a negative pressure within the chamber to evacuate any gas from the top of the container while the container is still connected to the chamber, wherein the filling head includes a ball valve with a passageway therein extending diametrically through the valve and having a cross-section corresponding to that of a supply tube leading to the nozzle, the ball valve being movable through 90° between the open and closed positions, and there being wiping seals between the ball valve and its housing.

2. Apparatus according to claim 1 wherein said means remote from said filling head also comprise means for introducing a sterile or inert gas into the chamber and hence into the top of the container above the product.

3. Apparatus according to claim 1 wherein said means remote from said filling head comprise fluid extractor/injector means which, after the head of the container has been closed, is actuated to apply a positive pressure to the chamber, whereupon the head of the container is removed from the chamber, thus preventing ingress of air into the chamber 4. Apparatus according to claim 3 wherein said means remote from said filling head includes one or more sterile gas and/or sterilant spray injector means mounted in the wall of the chamber and an extractor unit connected to a port in the chamber wall and capable of providing a negative pressure which will overcome the positive pressure provided by said spray injector means so that once a closure cap has been applied to the filled container, the positive pressure may be applied again to said chamber.

5. Apparatus according to claim 3 wherein said positive pressure is applied using two sterile gas spray injectors which spray sterile gas incorporating atomised sterilant into said chamber adjacent the filling head at all time so as to prevent ingress of air or foreign bodies into said sterile chamber.

6. Apparatus according to claim 1 wherein steam inlet and outlet lines extend into and out of said chamber, and to and from said filling head in said chamber.

7. Apparatus according to claim 1 which is for aseptically filling a bag with particulate product, and wherein the filling head terminates in a nozzle having the ball valve at or adjacent an outlet end thereof, and including means for presenting a spout of the bag to an aperture in the chamber, means for removing the cap, means for filling the bag, and means for re-capping the filled bag and removing the full bag.

8. Apparatus according to claim 7 including sealing means for sealing a portion of said bag to the rear face of its spout prior to the bag being withdrawn from an aperture in said chamber to form a secondary closure for the spout and an improved oxygen barrier for the spout area.

9. Apparatus according to claim 8 including means to move the sealing means and means to activate the sealing means, the means to move the sealing means being associated with means for moving the spout into and out of engagement with the aperture in said chamber, and with furthr means which is provided to support the bag during a filling operation.

10. Apparatus according to claim 7 wherein the filling valve comprises a ball valve with a passageway therein extending diametrically through the vale and having a cross-section corresponding to that of a supply tube leading to the nozzle, the ball valve being movable through 90° between open and closed positions, and there being wiping seals between the ball valve and its housing.

* * * * *